May 9, 1939.  L. C. RUSKA  2,157,350
AUTOMOBILE DOOR GLASS CONTROL
Filed Nov. 25, 1936   2 Sheets-Sheet 1
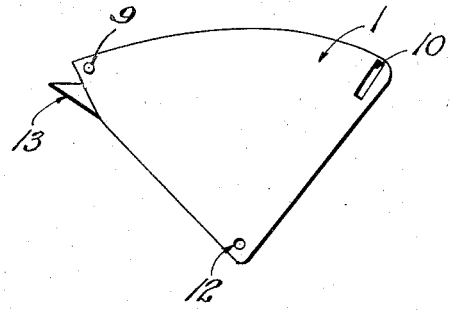
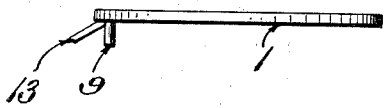
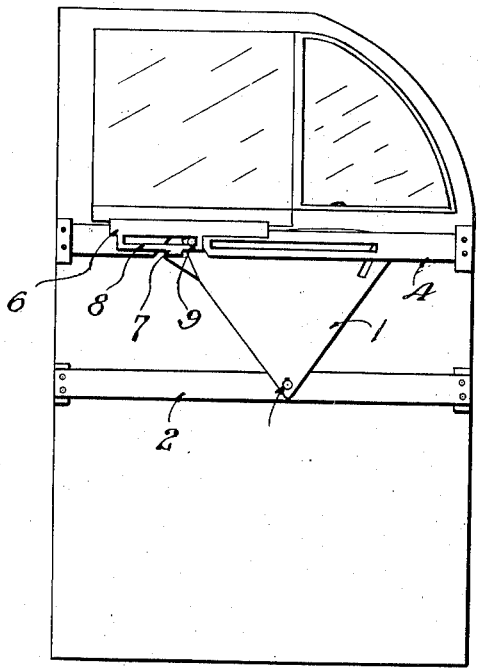
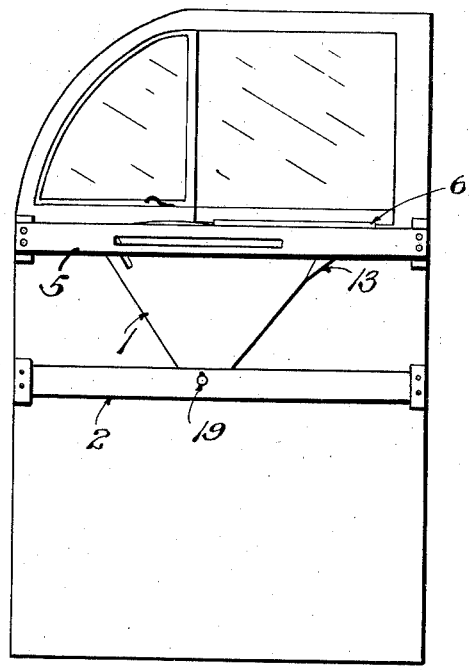
INVENTOR
Leslie C. Ruska May 9, 1939.   L. C. RUSKA   2,157,350
AUTOMOBILE DOOR GLASS CONTROL
Filed Nov. 25, 1936   2 Sheets-Sheet 2
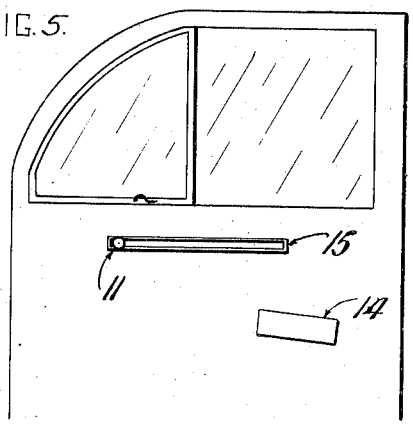
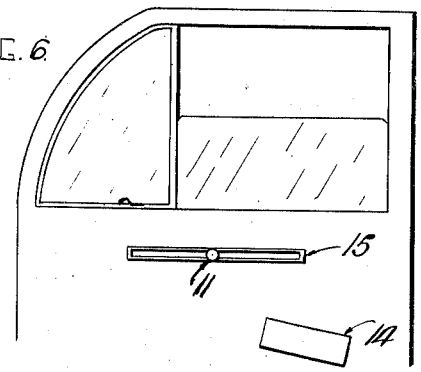
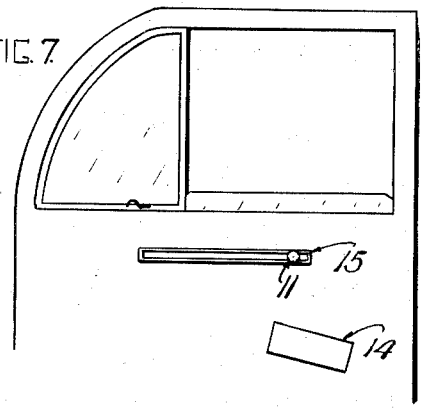
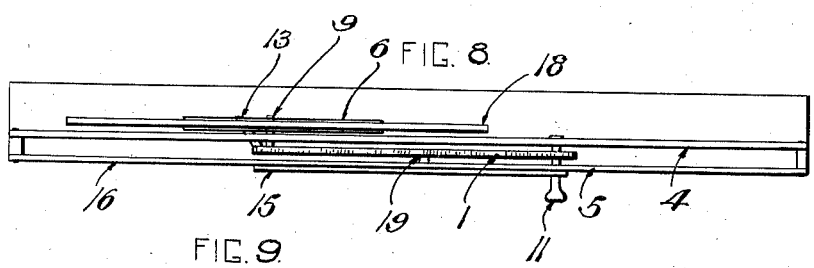
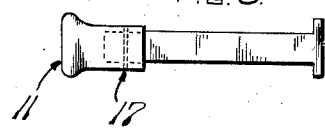
INVENTOR
Leslie C. Ruska Patented May 9, 1939

2,157,350

UNITED STATES PATENT OFFICE 2,157,350

AUTOMOBILE DOOR GLASS CONTROL

Leslie C. Ruska, Cicero, Ill.

Application November 25, 1936, Serial No. 112,696

2 Claims. (Cl. 268—126)

This system of window glass control eliminates the use of a crank which required from two to six complete turns to raise or lower the glass. With my system a control knob is used and is slid forward or backward in its guide, raising or lowering the glass in just a fraction of the time ordinarily required and with just a small portion of the usual expenditure of physical effort. This method of window control is definitely simpler in construction and operation than any other I know of. The control knob is merely slid through its slot greatly reducing the danger of bruised knuckles and torn and broken thumb and finger nails which are such a common occurrence with the crank system.

Another feature is the fact that this system leaves the doors clear of all cranks, making them neater and avoiding injury to the knees when the crank was left in a low position. I feel this system is much simpler, safer and decidedly more convenient.

Fig. 1 is a side view of the control arc. Fig. 2 is a top view of same.

Fig. 3 illustrates the mechanism in place in the automobile door. Fig. 4 is a view of the mechanism with the door upholstery removed. Fig. 5 is an inside view with the door control with the upholstery in place.

Figs. 6 and 7 show the door glass in two different positions with the control knob in its proper relative positions. Fig. 8 is a top view of the mechanism. Fig. 9 is the control knob.

Fig. 1 illustrates control member or arc 1, showing its arc pin 9, slotted groove 10 that receives handle means in the form of control knob 11. Hole 12 at the bottom receives pivot plug 19.

Fig. 2 is a top view of control arc 1 showing bumper 13 which pushes up under bumper block 7 when the glass is in its almost fully closed position offering assistance to arc pin 9.

Fig. 3 would be looking at the door from the outside with the metal door panel removed. We see the control arc 1 in place in the door. It is pivoted at the bottom and supported there by brace bar 2. Arc 1 is operated between guide bars 4 Fig. 3 and guide bar 5 Fig. 4. Both of the guide bars are slotted in the same positions. Glass holder 6 also carries bumper block 7 and slide assembly 8 in which arc pin 9 slides when control arc 1 is swung, pulling down the glass or pushing it up.

Fig. 8 is a top view of the mechanism. Looking from the bottom up we see first the car upholstery 16 carrying chromium guide 15. Then comes guide bar 5, then control arc 1, then guide bar 4 and last the door glass 18. The wing is omitted in this view. This view also illustrates how bumper 13 operates under bumper block 7. Control knob 11 is shown in its position through the guide slots it rides in, and through control arc 1. Pivot plug 19 is also shown.

When control knob 11 is pulled back, it slides easily in its grooves in guide bars 4 and 5 and pulls back arc 1 over its pivot 12 while arc pin 9 slides in assembly 8 and exerts a pull on the door glass, pulling it down. Pushing the glass up is just a reverse of that action.

Fig. 9 illustrates the control knob 11. The chromium head is attached to the steel body by pin 17. When wishing to remove the door upholstery, pin 17 is punched out, the knob head is removed and the upholstery can then be taken down.

This is the simplest and most convenient system of door glass control I know of.

I claim:

1. In combination with a vehicle door having an upper opening and a slidable window panel therein adapted to close said opening, a pair of spaced apart transversely extending guide bars adjacent the lower edge of said opening, said guide bars having opposed slots therein; a transversely extending supporting bar secured below said guide bars; a glass engaging member on the lower edge of the slidable window panel; a pivotal member pivoted adjacent one of its edges on said lower bar and adapted to be pivoted between said first mentioned spaced apart guide bars; a transversely extending pin on said pivotal member, said pivotal member having a downward slot spaced apart from its pivot, said pin being adapted to engage said glass engaging member; a bumper formed integral with said pivotal member and adapted to engage the lower edge of said glass engaging member when said pivotal member is moved to substantial window panel closing position; and handle means extending through said guide bar slots and through said pivotal member slot.

2. In combination with a vehicle door having an upper opening and a slidable window panel therein adapted to close said opening, a pair of spaced apart transversely extending guide bars adjacent the lower edge of said opening, said guide bars having opposed slots therein; a transversely extending supporting bar secured below said guide bars; a glass engaging member on the lower edge of the slidable window panel; a pivotal arc member pivoted adjacent one of its edges on said lower bar and adapted to be moved between said guide bars; a transversely extending pin on said pivotal member, said pivotal member having a downward slot spaced apart from its pivot, said pin being adapted to engage said glass engaging member; and handle means extending through said guide bar slots and through said pivotal member slot whereby said pivotal arc member is manually pivoted to move said window panel vertically.

LESLIE C. RUSKA.